(12) United States Patent
Morgan et al.

(10) Patent No.: US 12,019,976 B1
(45) Date of Patent: Jun. 25, 2024

(54) CALL TAGGING USING MACHINE LEARNING MODEL

(71) Applicant: Calabrio, Inc., Minneapolis, MN (US)

(72) Inventors: Dylan Morgan, Minneapolis, MN (US); Boris Chaplin, Medina, MN (US); Kyle Smaagard, Forest Lake, MN (US); Chris Vanciu, Isle, MN (US); Laura Cattaneo, Rochester, MN (US); Matt Matsui, Minneapolis, MN (US); Catherine Bullock, Minneapolis, MN (US)

(73) Assignee: Calabrio, Inc., Minneapolis, MN (US)

( * ) Notice: Subject to any disclaimer, the term of this patent is extended or adjusted under 35 U.S.C. 154(b) by 0 days.

(21) Appl. No.: 18/065,597

(22) Filed: Dec. 13, 2022

(51) Int. Cl.
*G06F 40/117* (2020.01)
*G06F 40/166* (2020.01)
*G06F 40/289* (2020.01)
*G06F 40/30* (2020.01)
*G06N 20/00* (2019.01)
*H04M 3/51* (2006.01)

(52) U.S. Cl.
CPC .......... *G06F 40/117* (2020.01); *G06F 40/166* (2020.01); *G06F 40/289* (2020.01); *G06F 40/30* (2020.01); *G06N 20/00* (2019.01); *H04M 3/5183* (2013.01)

(58) Field of Classification Search
CPC .... G06F 40/117; G06F 40/166; G06F 40/289; G06F 40/30; G06N 20/00; H04M 3/5183
See application file for complete search history.

(56) References Cited

U.S. PATENT DOCUMENTS

| | | | | |
|---|---|---|---|---|
| 8,612,211 | B1 * | 12/2013 | Shires | G10L 21/10 704/235 |
| 9,509,846 | B1 * | 11/2016 | Jandwani | H04M 3/42221 |
| 2004/0039779 | A1 * | 2/2004 | Amstrong | H04L 12/1827 709/236 |
| 2006/0129381 | A1 * | 6/2006 | Wakita | G06F 40/45 704/9 |
| 2009/0112573 | A1 * | 4/2009 | He | G06F 40/45 704/4 |
| 2017/0357903 | A1 * | 12/2017 | Pal | G06Q 50/01 |
| 2018/0032585 | A1 * | 2/2018 | Kadiyala | G06N 20/00 |

(Continued)

FOREIGN PATENT DOCUMENTS

WO    WO-2018205389 A1 * 11/2018    ........... G06F 17/271

*Primary Examiner* — Eric Yen

(57) ABSTRACT

Systems and methods disclosed relate to contextually tagging statements associated with calls. In particular, the contextual tagging is directed to training a call tagging model for predicting one or more categories associated with a statement for tagging. The disclosed technology generates training data for training the call tagging model based on a list of known phrases used in contacts in a contextual category and matching phrases and words in the list of known phrases against words and phrases used in statements in sample call transcripts. The call tagging model is fine-tuned by using sample statements that appear in contacts. Once trained, the call tagging model is used to determine a probability distribution of categories associated with statements in a contact and further determine contact-level category distributions using multi-dimensional vectors. The tagged contacts are used to determine contacts that are contextually similar to a given contact.

20 Claims, 7 Drawing Sheets

(56) References Cited

U.S. PATENT DOCUMENTS

2019/0347668 A1* 11/2019 Williams ................. H04L 51/02
2021/0118432 A1* 4/2021 McCourt .................. G06N 5/04
2021/0182498 A1* 6/2021 Sun ......................... G06F 40/40

* cited by examiner

CALL TAGGING USING MACHINE LEARNING MODEL

BACKGROUND

Categorizing incoming calls or contacts based on content is a complex yet important task for reviewing and improving services for a contact center support. Agents at contact centers manually tag contacts after completing contacts. Values of tags allowed for the agents to enter are often limited. Some others determine a category of contacts based on a word-by-word matching of words or phoneme matching.

It is with respect to these and other general considerations that the aspects disclosed herein have been made. Although relatively specific problems may be discussed, it should be understood that the examples should not be limited to solving the specific problems identified in the background or elsewhere in this disclosure.

SUMMARY

Aspects of the present disclosure relate to determining one or more categories of a call (e.g., tagging a call) based on the context of the call. A model predicts a tag that represents a category associated with a portion of the call transcript. Training of the model uses statement data as training data to predict a category in a given set of statements. The model may be a transformer model.

The phrases "tagging a call" and "a call tagging" herein refer to determining one or more categories (e.g., a tag) to a call or a contact. The object of the tagging is not limited to calls but other sets of data with a context. The phrase "category" and "contextual category" herein refer to a category of context.

This Summary introduces a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

Figure 5:
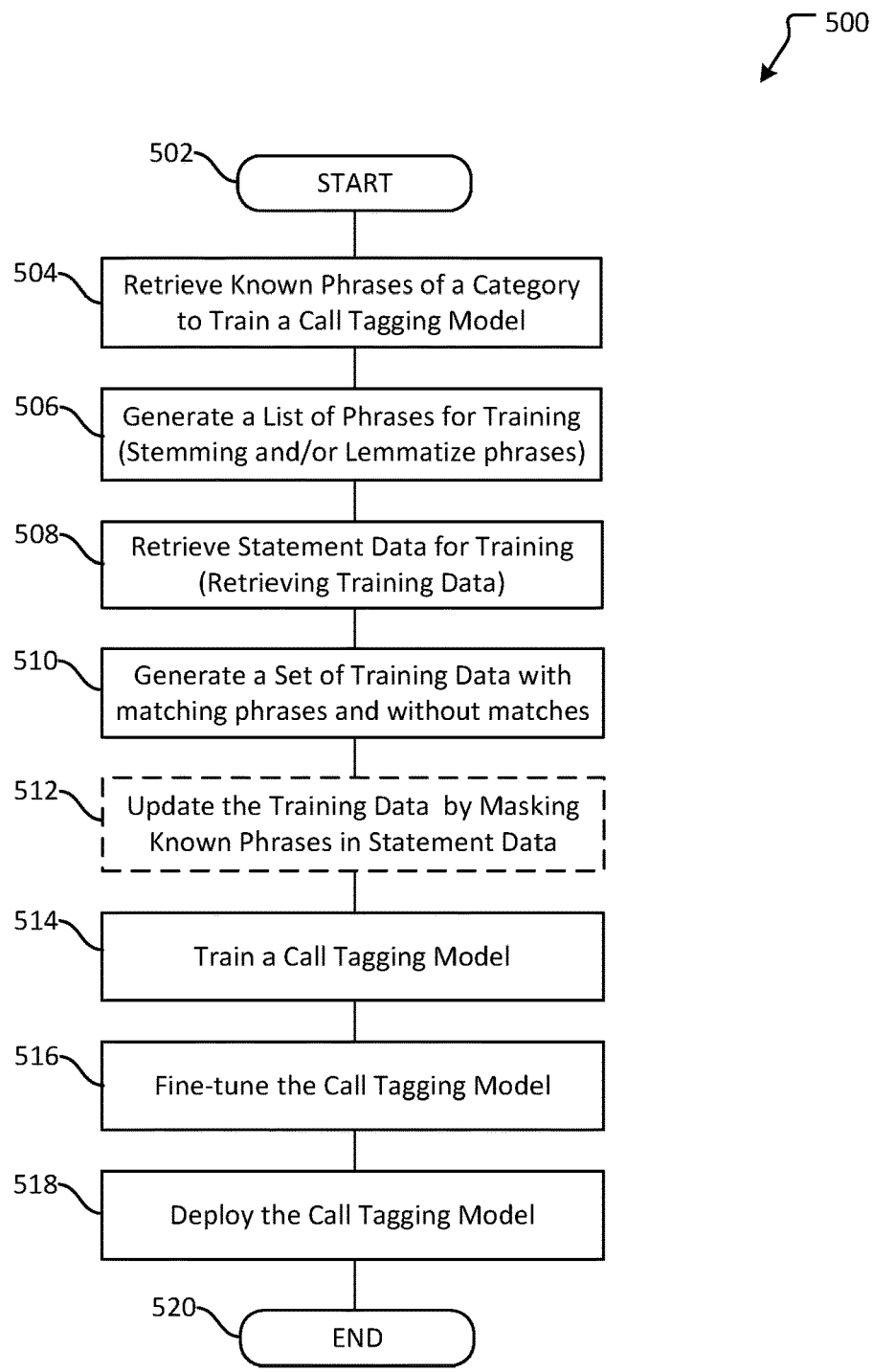

FIG. 5. illustrates an example method for training a call tagging model in accordance with aspects of the present disclosure.

Figure 6:
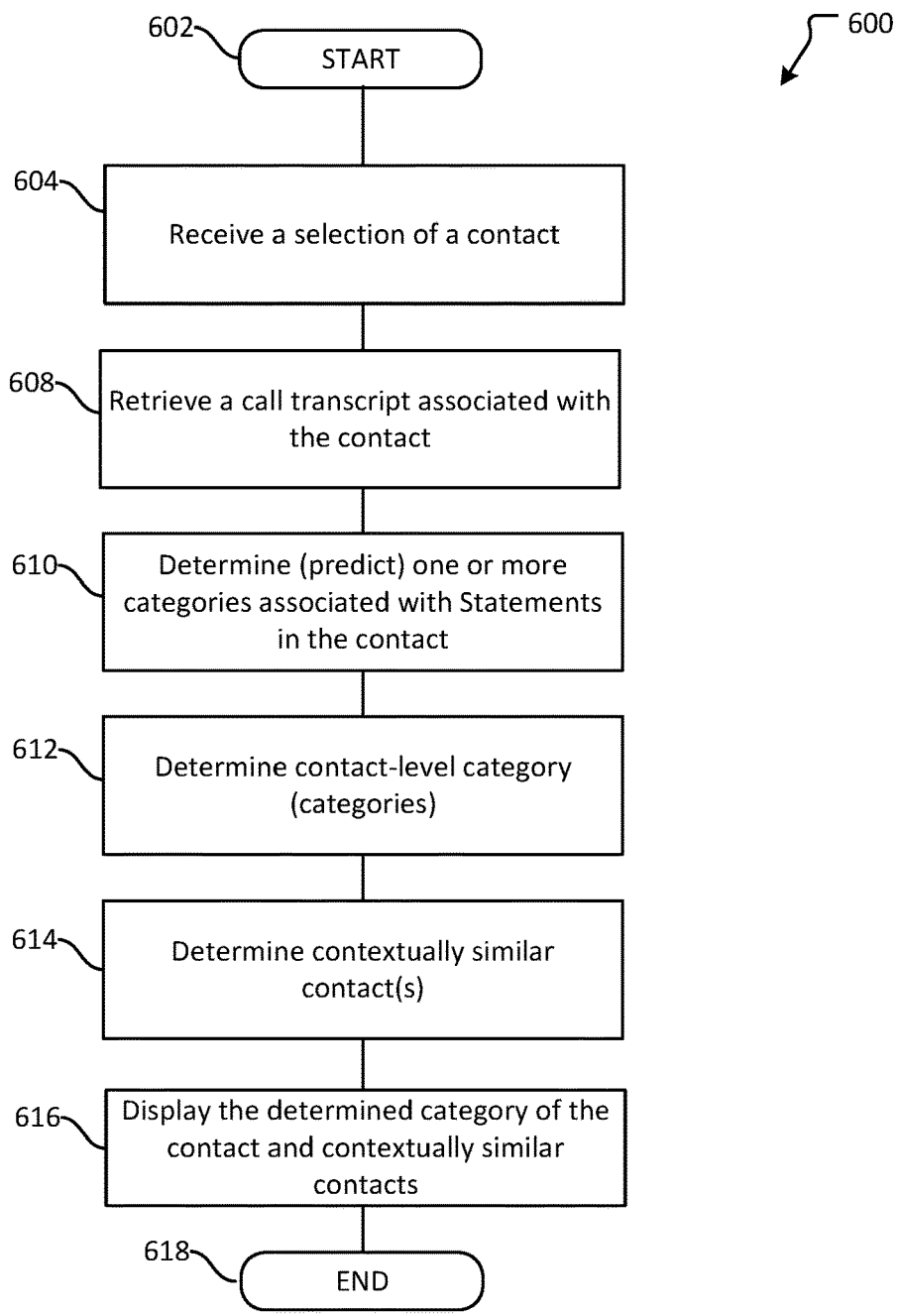

FIG. 6. illustrates an example method for determining a contextual category as a tag associated with a call in accordance with aspects of the present disclosure.

Figure 7:
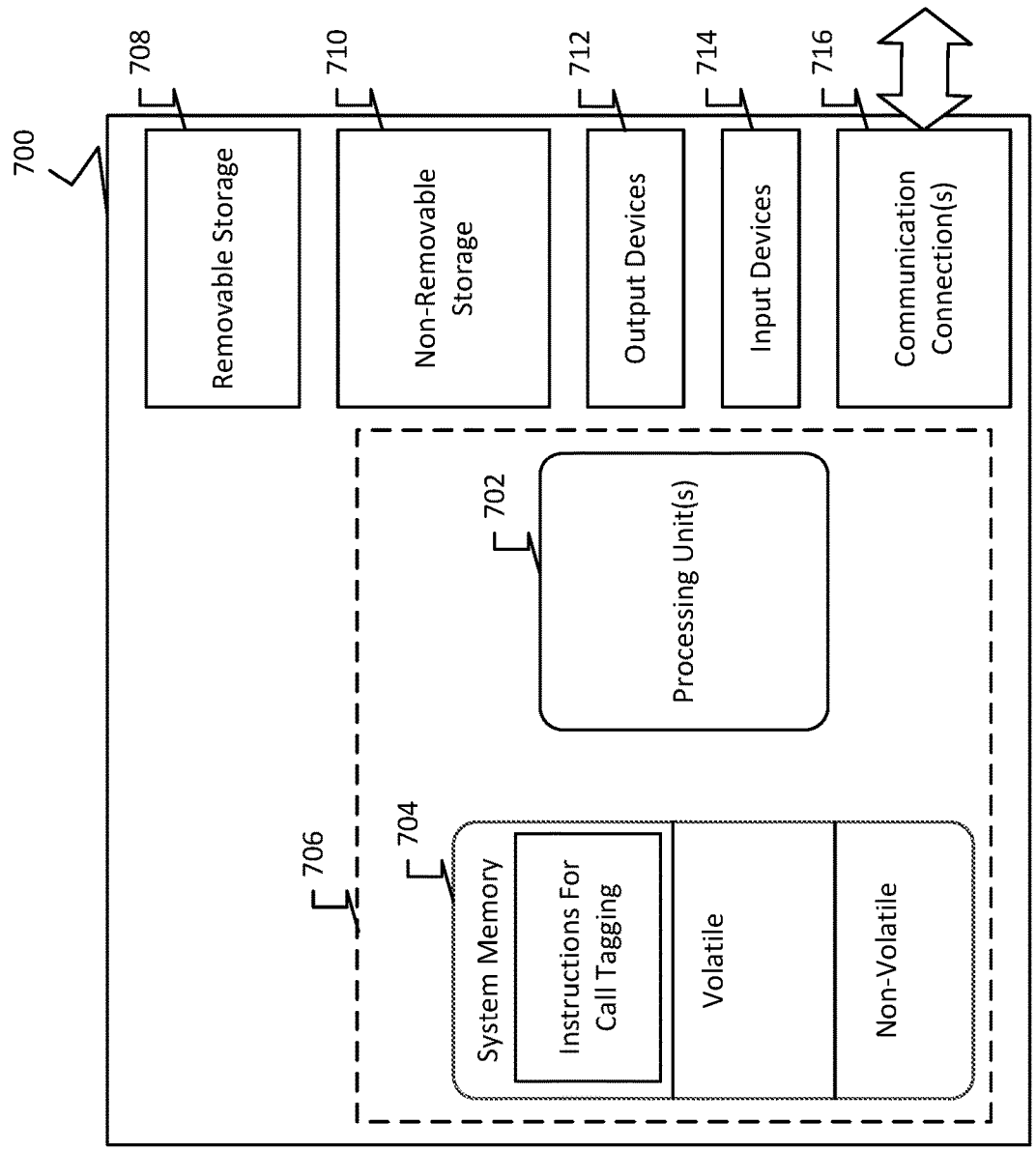

FIG. 7 illustrates a simplified block diagram of a device with which aspects of the present disclosure may be practiced in accordance with aspects of the present disclosure.

DETAILED DESCRIPTION

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Practicing aspects may be as methods, systems, or devices. Accordingly, aspects may take the form of a hardware implementation, an entirely software implementation or an implementation combining software and hardware aspects. The following detailed description is, therefore, not to be taken in a limiting sense.

Categorizing a call or a contact with accuracy is an important task for evaluating calls and for improving the quality interactions with customers and clients. For example, incoming contacts may include an escalation to a supervisor. Reviewing the contacts include understanding reasons behind the escalation. Call transcript provides a valuable information for determining events (e.g., escalations) that have occurred and reasons behind their occurrence. The call's context needs to be accurately categorized under a category of escalation in order to enable retrieving the call based on searching under the category. While examples of the present disclosure are described contacts with respect to calls, one of skill in the art will appreciate that the aspects disclosed herein may be practiced with other types of mediums, such as emails, text messages, instant messages, video communications, documents, and the like.

An issue arises in efficiently and accurately determining a category for a call. Traditional methods have been resource intensive and often lack accuracy in determining categories for contacts. For example, manually reviewing call transcripts is resource intensive and time-consuming. Word-by-word matching between words that appear in call transcripts and words in a list of words associated with a category (e.g., a word "escalate" and/or "supervisor" for the category of escalation) is often inaccurate because the number of words in the list is limited and lacks variations that are sufficiently cover contextually similar used during contacts. Further, prior solutions using word-by-word matching can be processing, memory, and network resource intensive. Additional issues include building an effective list being limited to the ingenuity of the individuals building the list and their command of the language being utilized. Matching data based on phoneme matching may lack accuracy and need substantial tuning for improving accuracy.

Accordingly, there is a need to improve both efficiency and accuracy of determining a category of a contact. As detailed below, the present disclosure relates to categorizing a contact (e.g., tagging a call). In particular, the disclosed technology is directed to training a call tagging model and using the call tagging model to determine a category associated with a contact. In examples, the call tagging model is a machine learning model that, once trained, predicts a category based on a statement as an input. Tagging contacts enables identifying one or more contacts that have contextually similar scenarios across transcripts. For example, a call transcript may be tagged as an escalation request by one tag and a password reset by another tag. Continuing the example, a call having an escalation request as well as a password reset could be considered contextually similar to another call that also has an escalation tag included with a password reset.

Training of the call tagging model includes generating training data based on statement data and known variations of phrases of a category as ground truth data. The training data includes two types of data, one set of data that includes the known variations of phrases in statements and another set of data that does not include the phrases. The call tagging model may be a transformer model, however other types of machine learning models may be employed without departing from the scope of this disclosure.

Figure 1:
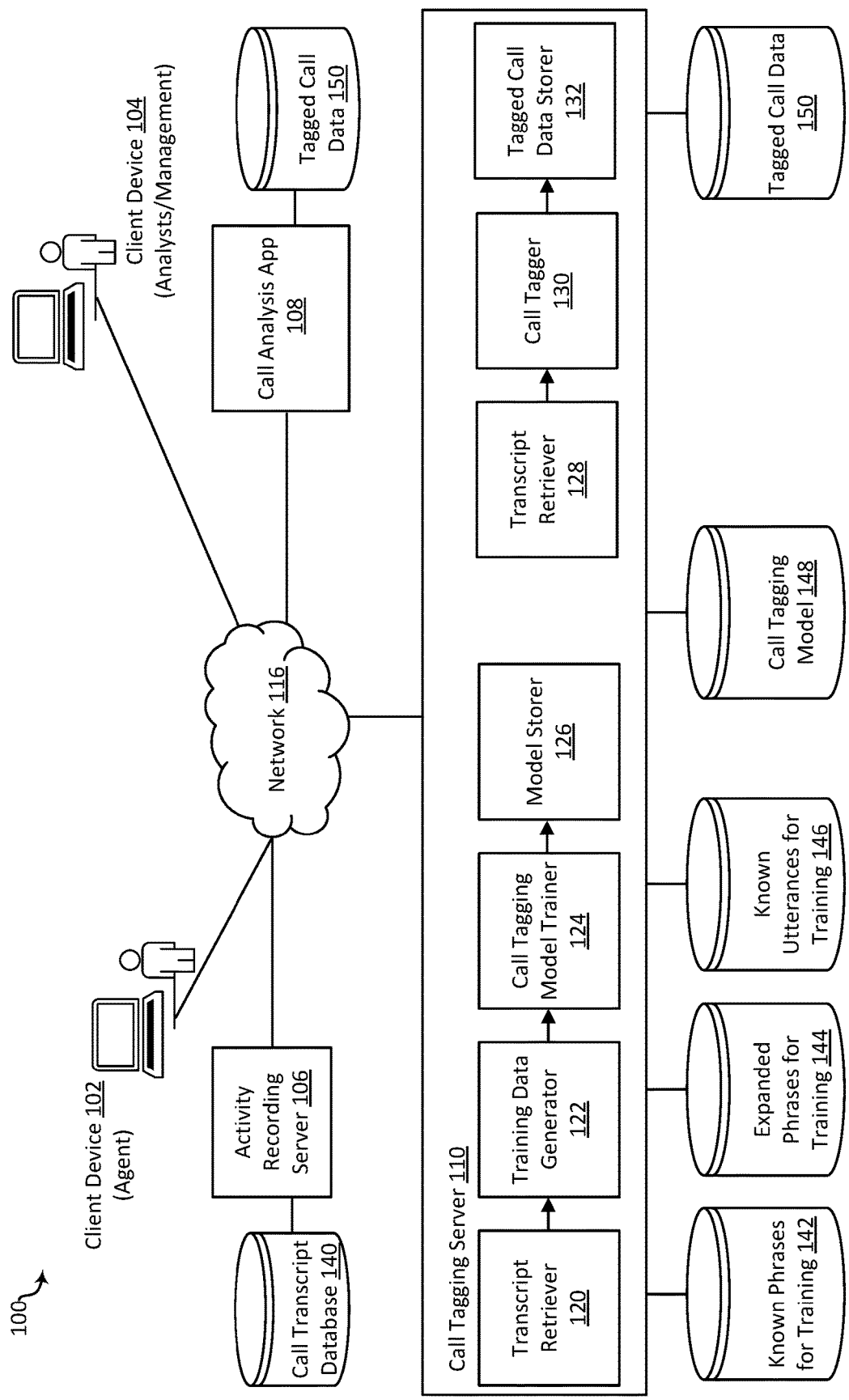
FIG. 1 illustrates an overview of an example system for call tagging in accordance with aspects of the present disclosure.

FIG. 1 illustrates an overview of an example system for call tagging in accordance with aspects of the present disclosure. System 100 includes a client device (agent) 102, a client device (analysts/management) 104, an activity recording server 106, a call analysis app 108, a call tagging server 110, interconnected via a network 116. The client device (agent) 102 is an example client device that an agent uses while performing a task of taking calls or contacts from customers. The client device (analysts/management) 104 is an example client device for interactively reviewing and analyzing contacts based on one or more categories assigned to the respective contacts. Examples of the one or more categories associated with contacts include escalation, termination, compliance, returns, customer, complaints, billing, and like.

The activity recording server 106 records work activities performed by agents. In aspects, the activity recording server 106 converts audio data associated with contacts into text data as call transcripts. The activity recording server 106 includes call transcript database 140. The call transcript database 140 stores call transcripts and information associated with contacts (date, time, duration, call scripts, and the like). In aspects, the call transcript database 140 may be indexed for retrieving call transcripts based on various parameters including an agent identifier, a date, a time a call duration, a task assigned, and the like.

The call analysis app 108 enables analysts and managers using the client device 104 to retrieve and review contacts. The call analysis app 108 includes tagged call data 150. The tagged call data 150 includes call transcripts and one or more categories (e.g., tags) associated with the respective call transcripts for retrieval. For example, the call analysis app 108 retrieves one or more contacts (and corresponding call transcripts) that are contextually similar to a given contact by searching for contacts based on tags. As noted, while examples of the present disclosure are described contacts with respect to calls, one of skill in the art will appreciate that the aspects disclosed herein may be practiced with other types of mediums, such as emails, text messages, instant messages, video communications, documents, and the like.

The call tagging server 110 includes transcript retriever 120, training data generator 122, call tagging model trainer 124, model storer 126, transcript retriever 128, call tagger 130, and tagged call data storer 132. In particular, a set including the transcript retriever 120, the training data generator 122, the call tagging model trainer 124, and the model storer 126 represents functional aspects of training a call tagging model. A set including the transcript retriever 128, the call tagger 130, and the tagged call data storer 132 represents functional aspects of tagging a call. The call tagging server 110 accesses known phrases for training 142, expanded phrases for training 144, known statements for training 146, call tagging model 148, and tagged call data 150.

In examples, the transcript retriever 120 retrieves a call transcript of a contact from the call transcript database 140. The call transcript includes statements used to generate training data for training the call tagging model.

The training data generator 122 generates training data for training the call tagging model 148. In particular, the training data generator 122 extracts a plurality of statements from the call transcript. In aspects, a statement includes one or more sentences uttered by a person during a time between the person starts to speak and the speaker changes to another person during a conversation. The training data generator 122 retrieves a set of known phrases associated with a category from the known phrases for training 142. In examples, the set of known phrases associated with a category may be generated as ground truth data. For example, a set of known phrases associated with a category of "compliance" as context may include one or more of the following phrases: "confirm the last four, name and date of birth, what is the expiration date, social security number, monitored or recorded, this call may be monitored and recorded, thanks for calling, thank you for calling, this call is being recorded, our calls are recorded for quality purposes, security code on the back of the card, on a recorded line, call will be monitored, call may be monitored, your primary care provider, do you have a primary care provider, credit card information, is there anything else."

Additionally, the training data generator 122 may expand the phrases by using a tool that generates a list of synonym phrases. Examples of the list of synonym phrases include the following:

Input: "your primary care provider"
Output: "your primary health care provider", "what is your primary care physician", "your primary care physician", "your provider of primary care", "your primary provider", "your primary caregiver"
Input: "thank you for calling"
Output: "thank you for calling me", "very much for calling", "i am so grateful for your call", "i appreciate your calling", "thanks for calling"

Furthermore, the training data generator 122 may expand the set of known phrases based on tenses and other attributes by using natural language processing techniques including stemming and lemmatizing. Examples of expanding the set of known phrases may further include machine learning models that generate phrases with similar meanings. The training data generator 122 stores the expanded known phrases in the expanded phrases for training 144.

The training data generator 122 generates training data by generating two sets of statement data using the set of statement data based on the expanded set of known phrases associated with a category. A first set of statement data includes statements that include one or more phrases in the expanded set of known phrases. The first set of statement data represents training data for the category. A second set of statement data includes statement that does not include a phrase in the expanded known phrases. The second set of statement data represents training data for not being in the category. The training data generator 122 stores both sets of statement data in the known statements for training 146.

The training data generator 122 may generate a third set of statement data by masking known phrases from the first set of statement data. The third set of statement data may be used as ground truth data for training the call tagging model for the category.

The training data generator 122 generates the masked statements by removing from the statements the phrase that was matched, either exactly or using other techniques including a fuzzy logic. For example, a statement indicates: "Hi, I'm calling I think my bill is wrong. Usually, it's only $100 but this time it's nearly $200." A masked statement becomes: "Hi, I'm calling I think. Usually, it's only $100 but this time it's nearly $200." The phrase "my bill is wrong" is removed from the statement because the phrase is a known phrase associated with a category of "Billing."

In aspects, starting from a prebuilt language-specific language model allows for simplification of the training process and reducing the need for large volumes of known statement training data. The call tagging model trainer 124 trains the call tagging model 148. In aspects, the call tagging model includes a transformer model. Based on the two sets of known statements as training data, the call tagging model trainer 124 trains the call tagging model 148 for both predicting a statement as being classified in the category and another statement as not being classified in the category. In aspects, the call tagging model 148 may represent a single-category model that predicts whether a call transcript represents a single category. In some other aspects, the call tagging model 148 may represent a multi-category model that predicts one more categories for statements in a call transcript.

The call tagging trainer 124 further fine-tunes the call tagging model 148. In aspects, in case of starting from a prebuilt language-specific language model, the call tagging trainer 124 may be further trained by fine-tuning the first set of statements with known phrases and a second set of statements without known phrases. Optionally, further fine-tuning of the call tagging model 148 may be done using an optional third set representing positive ground truth data, including masked statements that belong to one or more categories. Training the call tagging model 148 by further fine-tuning using the optional third set of training data reduces bias of known phrases. The model storer 126 stores the call tagging model 148 for deployment.

The transcript retriever 128 retrieves a call transcript associated with a contact for determining a category for the call transcript using the call tagging model 148. The call tagger 130 generates a set of statements by extracting sets of statements from the call transcript.

The call tagger 130 determines one or more categories (e.g., tagging) the set of statements using the call tagging model 148. The call tagging model 148 takes the sets of statements as input and predicts one or more categories associated with the respective statements. In examples, the call tagging model 148 that is a multi-category model generates a multi-dimensional category vector (e.g., a multi-dimensional statement-level category vector and a multi-dimensional contact-level category vector). The multi-dimensional category vector includes a plurality of dimensions, each dimension indicating whether the statement includes a particular category. In other examples, the call tagging model 148 that is a single-category model generates a value that indicates whether or not the statement includes a particular category. Additionally, or alternatively, the value may represent a set of probabilities that indicate a likelihood of the statement including a particular category. The set of probabilities may be used for determining that the statement includes a particular category based on a predetermined threshold. The call tagger 130 tags the set of statements based on output from the call tagging model 148. The tagged call data storer 132 stores the tagged call data 150.

As will be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

Figure 2:
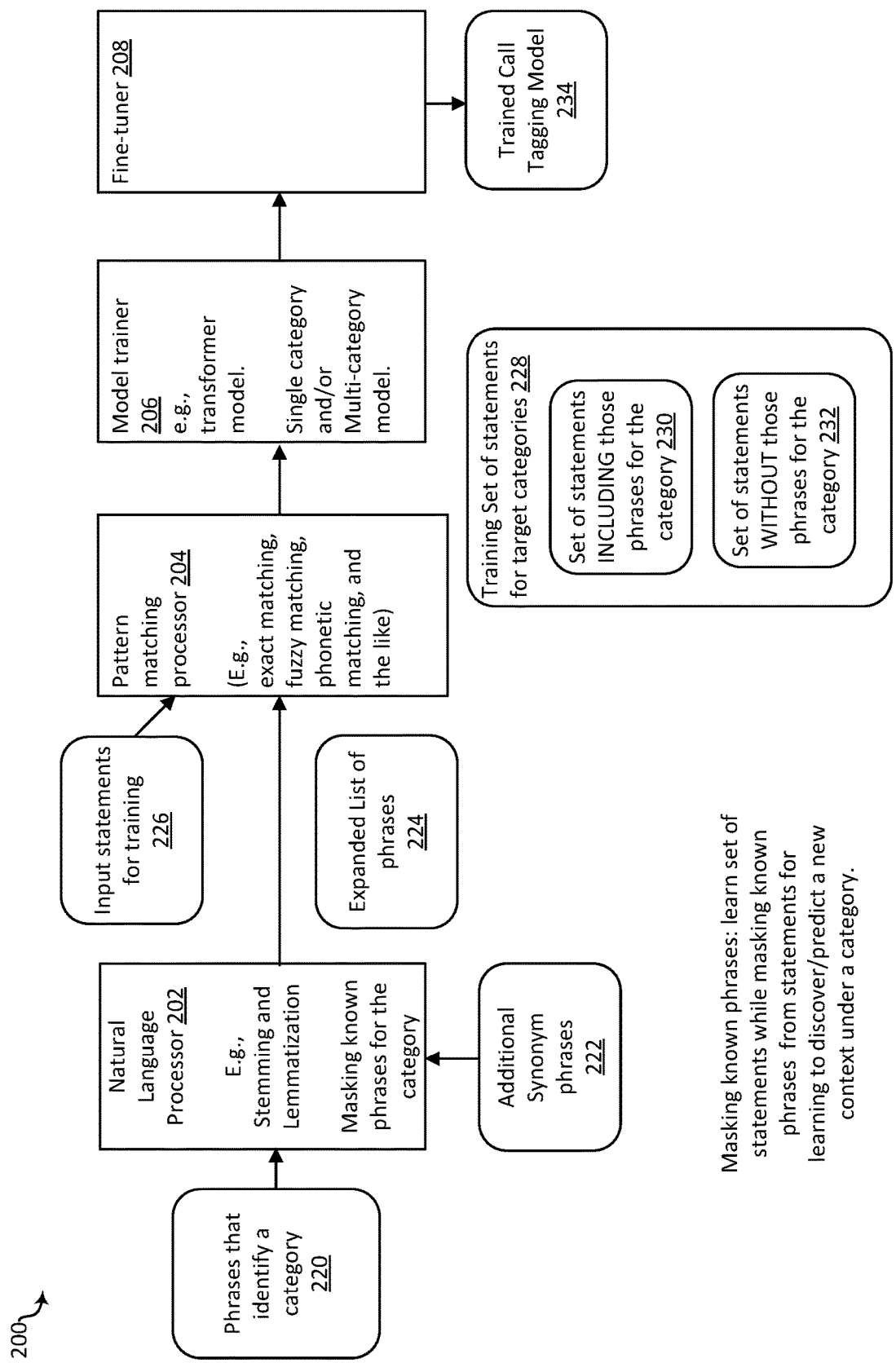
FIG. 2 illustrates an example system for training a call tagging model in accordance with aspects of the present disclosure.

FIG. 2 illustrates an example system for training a call tagging model in accordance with aspects of the present disclosure. The call tagging model may be a machine learning model, such as, for example, a transformer model. The system 200 includes natural language processor 202, pattern matching processor 204, model trainer 206, and fine-tuner 208. The natural language processor 202 receives phrases that people look for in identifying a category 220 as a set of known phrases. In aspects, the phrases that people look for in identifying the category may be generated manually. In some other aspects, the phrases may be automatically or dynamically generated. The natural language processor 202 further receives additional synonym phrases 222 for expanding the set of known phrases. In examples, the natural language processor 202 includes stemming and lemmatization. Additionally, or alternatively, the natural language processor 202 masks known phrases for the category. Accordingly, the natural language processor 202 generates an expanded list of known phrases 224 for the category.

The pattern matching processor 204 uses input statements for training 226 and the expanded list of known phrases 224 to generate a training set of statements for target categories 228. The pattern matching processor 204 includes one or more types of pattern matching including, but not limited to, exact matching, fuzzy matching, phonetic matching, and the like. The training set of statements for target categories 228 includes two lists of statements. Statements in a first set of statements include those known phrases for the target category 230. Statements in a second set of statements does not include those known phrases for the target category 232.

The model trainer 206 uses the training set of statements for target categories 228 to train the call tagging model. In aspects, the call tagging model includes, but is not limited to, a transformer model. The call tagging model may be a single category model or a multi-category model.

The fine-tuner 208 fine-tunes the trained call tagging model. Examples of the fine-tuning may include additional training of the call tagging model by using contact center-specific statements as a target topic area with known categories as known training data. The fine-tuner 208 outputs the trained call tagging model 234. In aspects, the target topic area is not limited to call centers but may be other topic areas of using statements. In some aspects, the model trainer 206 and the fine-tuner 208 may be combined.

As will be appreciated, the various methods, devices, applications, features, etc., described with respect to FIG. 2 are not intended to be limited to use of the system 200, rather the system 200 is provided as an exemplary system that may be used by the aspects disclosed herein. Accordingly, additional data structures or configurations may be used to practice the methods and systems herein and/or features and applications described may be excluded without departing from the methods and systems disclosed herein.

Figure 3:
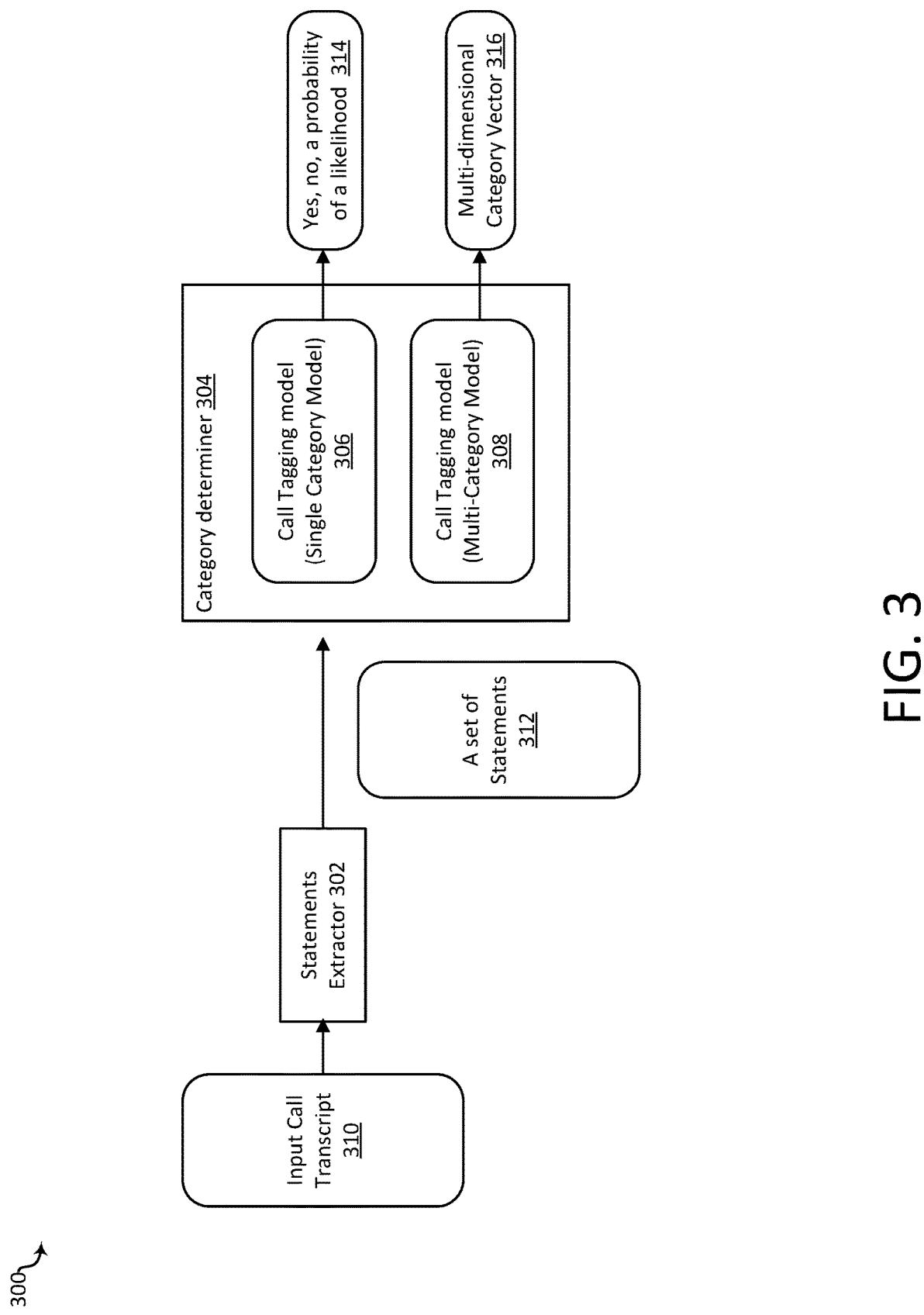
FIG. 3 illustrates an example system for predicting one or more categories as tags based on a call in accordance with aspects of the present disclosure.

FIG. 3 illustrates an example system for predicting one or more categories as tags based on a call in accordance with aspects of the present disclosure. The system 300 includes statements extractor 302 and a category determiner 304. The statements extractor 302 extract a set of statements 312 from an input call transcript 310 associated with the call. A statement corresponds to a set of sentences uttered by a person (e.g., a customer or an agent) from a time when the person starts talking up to a time when a speaker switches to another person in the conversation.

The category determiner 304 determines one or more categories associated with one or more statements in the set of statements. When the system uses a call tagging model (single category model) 306, the call tagging model (single category model) 306 outputs a value indicating whether the set of statements includes a particular category (e.g., yes, no, or a probability of a likelihood 314). When the system uses a call tagging model (multi-category model) 308, the call tagging model (multi-category model) 308 generates a multi-dimensional statement-level category vector 316 where each dimension of the multi-dimensional statement-level vector corresponds to a category and indicates whether the set of statements includes a single category. In examples, each dimension indicates a value representing "yes," "no," or a probability of a likelihood.

As will be appreciated, the various methods, devices, applications, features, etc., described with respect to FIG. 3 is not intended to limit use of the example system 300. Accordingly, additional and/or alternative processes and configurations may be used to practice the methods and systems herein and/or features and applications described may be excluded without departing from the methods and systems disclosed herein.

Figure 4:
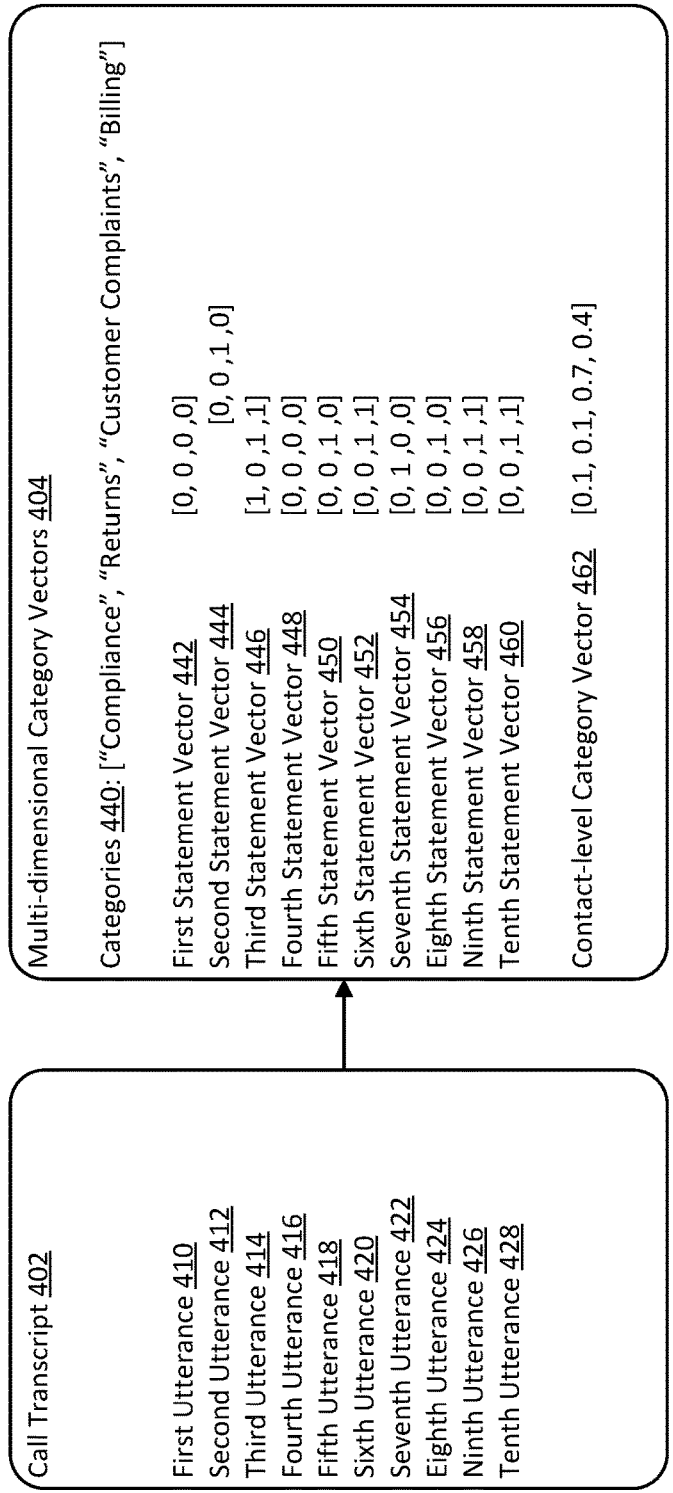
FIG. 4 illustrates example data structures associated with transcript data and multi-dimensional category vector data in accordance with aspects of the present disclosure.

FIG. 4 illustrates example data structures associated with transcript data and multi-dimensional category vector data in accordance with aspects of the present disclosure. The data structure 400 includes call transcript 402 and multi-dimensional category vector 404.

The call transcript 402 includes a set of statements. A statement includes one or more fragments of a sentence. A sentence includes one or more words. In examples the call transcript 402 includes ten statements: first statement 410, second statement 412, third statement 414, fourth statement 416, fifth statement 418, sixth statement 420, seventh statement 422, eighth statement 424, ninth statement 426, and tenth statement 428.

A trained call tagging model outputs one or more multi-dimensional category vectors for respective statements. As an example, the multi-dimensional category vector 404 indicates a probability distribution of categories for either a statement or a contact. In examples, the probability distribution is at the statement level while the contact level vector is a category distribution. The multi-dimensional category vector may be calculated a number of different ways, such as by generating an average, and addition, etc., as discussed below. The multi-dimensional category vector 404 in the example includes a set of ten multi-dimensional statement-level category vectors and one multi-dimensional contact-level category vector. Each multi-dimensional category vector 404 includes four dimensions, each dimension corresponding to a category such as, for example "Compliance," "Returns," "Customer Complaints," "Billing." While specific categories have been described herein, one of skill in the art will appreciate that the number and type of categories may vary depending upon the environment in which aspects of the present disclosure is practiced. The multi-dimensional category vector 404, as an example, includes a first statement vector 442 with value [0,0,0,0], a second statement vector 444 with value [0, 0,1,0], a third statement vector 446 with value [1, 0,1,1], a fourth statement vector 448 with value [0, 0,0,0], a fifth statement vector 450 with value [0, 0,1,0], a sixth statement vector 452 with value [0, 0,1,1], a seventh statement vector 454 with value [0, 1,0,0], an eighth statement vector 456 with value [0, 0,1,0], a ninth statement vector 458 with value [0, 0,1,1], and a tenth statement vector 460 with value [0, 0,1,1]. For example, the second statement vector 444 with a value [0, 0, 1, 0] indicates with a value zero in the respective dimensions such that the second statement 412 is not under a category of compliance, returns, or billing, but, with a value of one, indicates that the second statement 412 is within a category of customer complaints.

The contact-level category vector 462 has value [0.1, 0.1, 0.7, 0.4]. In examples, values in the respective dimensions (e.g., categories) of the multi-dimensional contact-level category vector are based on averages of values of the respective dimensions across one or more (or all) of multi-dimensional vectors associated with statements in the contact. For example, a first dimension corresponding to a category "Compliance" of the contact-level category vector 462 is a value 0.1 because it is an average of values of the first dimension of all the ten statement vectors. In the example, the third statement vector 446 has a value one in the first dimension and all other statement vectors have a value zero and thus the average is of value one-tenth.

In other aspects, the values in the respective dimensions of the contact-level category vector 462 may be based on weighted averages. Some of categories may weigh more than others in characterizing the overall contact based on one or more categories, particularly in analyzing a short contact where the number of statements is relatively small.

As will be appreciated, the various methods, devices, applications, features, etc., described with respect to FIG. 4 are not intended to be limited to use of the data structure 400, rather the data structure 400 is provided as an exemplary system that may be used by the aspects disclosed herein. Accordingly, additional data structures or configurations may be used to practice the methods and systems herein and/or features and applications described may be excluded without departing from the methods and systems disclosed herein.

FIG. 5. illustrates an example method for training a call tagging model in accordance with aspects of the present disclosure. A general order of the operations for the method 500 is shown in FIG. 5. Generally, the method 500 begins with start operation 502 and end with end operation 520. The method 500 may include more or fewer steps or may arrange the order of the steps differently than those shown in FIG. 5. The method 500 can be executed as a set of computer-executable instructions executed by a cloud system and encoded or stored on a computer readable medium. Further, the method 500 can be performed by gates or circuits associated with a processor, an ASIC, an FPGA, a SOC or other hardware device. Hereinafter, the method 500 shall be explained with reference to the systems, components, devices, modules, software, data structures, data characteristic representations, signaling diagrams, methods, etc., described in conjunction with FIGS. 1, 2, 3, 4, 6, and 7.

Following start operation 502, the method 500 begins with retrieve operation 504, which retrieves a base set of known phrases of a category to train a call tagging model. In aspects, the base set of known phrases includes phrases that are known to be frequently used when a contact is categorized in a particular category. In examples, the base set of known phrases may be generated manually prior to generating training data for training the call tagging model.

At generate a list of phrases operation 506, a list (or a set) of phrases associated with the category is generated. The list of phrases is an expanded set of the base set of known phrases. In examples, one or more techniques associated with natural language processing may be used to automatically determine additional phrases based on varying tenses and identifying synonyms of words and phrases of the base set of known phrases. Examples of the one or more techniques may include but not limited to stemming and lemmatizing. Additionally, or alternatively, the base set of known phrases may be expanded by using various types of matching patterns of phrases and words in example statements. Examples of the various types of matching include exact matching, phonetic matching, gestalt pattern matching, and the like.

At retrieve statement data operation 508, a set of statement data for training is retrieved. In examples, the set of statement data is based on call transcript data from contacts. A call transcript data includes one or more statements. A statement includes one or more fragments of a sentence from a time that a person starts uttering in a conversation until a time when another person starts uttering in a conversation. A sentence can include one or more phrases. A phrase includes one or more words. In examples, the retrieve statement data operation 508 may include extracting a set of statements from the call transcript data.

At generate operation 510, a set of training data is generated. The set of training data includes first and second sets of statement data. The first set of statement data includes statements with matching phrases with the list of phrases. The second set of statement data includes statements that do not include matching phrases with the list of phrases. The first set of statement data may be used as positive ground truth data for training the call tagging models for predicting the category. The second set of statement data may be used as negative ground truth data for training the call tagging model for predicting the category.

At an optional operation of update operation 512, the first set of statement data is updated for generating a third set of statement data by masking out known phrases from statements in the first set of statement data. The third set of statement data may be used as positive ground truth data for training the call tagging data, thereby reducing possible biases caused by a presence of the known phrases in the training data.

At train operation 514, the call tagging model is trained. In aspects, the call tagging model includes, but is not limited to, a transformer model. The first and second sets, and optionally the third set of statement data are used for training the call tagging model.

At fine-tune operation 516, the trained call tagging model is fine-tuned for improving accuracy of predicting categories for statements. For example, the fine-tuning operation 516 may include use of additional sets of statements that appear in contacts associated with a customer support or a particular area within the customer support as a topic area for fine-tuning. The topic area is not limited to the customer support.

At deploy operation 518, the trained call tagging model is deployed to a production environment for predicting one or more categories on given statements. The method 500 ends with an end operation 520.

As should be appreciated, operations 502-520 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

FIG. 6. illustrates an example method for determining a contextual category as a tag associated with a call in accordance with aspects of the present disclosure. A general order of the operations for the method 600 is shown in FIG. 6. Generally, the method 600 begins with start operation 602 and ends with end operation 618. The method 600 may include more or fewer steps or may arrange the order of the steps differently than those shown in FIG. 6. The method 600 can be executed as a set of computer-executable instructions executed by a cloud system and encoded or stored on a computer readable medium. Further, the method 600 can be performed by gates or circuits associated with a processor, an ASIC, an FPGA, a SOC or other hardware device. Hereinafter, the method 600 shall be explained with reference to the systems, components, devices, modules, software, data structures, data characteristic representations, signaling diagrams, methods, etc., described in conjunction with FIGS. 1, 2, 3, 4, 5, and 7.

Following start operation 602, the method 600 begins with receive operation 604, which receives a selection of a contact. The method 600 determines one or more categories associated with the contact. In aspects, the method 600 may determine no categories associated with the contact based on an output from the trained call tagging model.

At retrieve operation 608, a call transcript data associated with the selected contact is retrieved. In aspects, the retrieve operation 608 retrieve the call transcript data from a call transcript database by querying based on an identifier of the selected contact.

At determine one or more categories operation 610, one or more categories associated with respective statements in the call transcript are determined (or predicted) using the trained call tagging model. In aspects, the trained call tagging model has been fine-tuned to predict categories for statements that appear in contacts. In examples, the one or more categories associated with a statement may be expressed using a multi-dimensional vector, each dimension corresponding to a status indicating whether the statement indicates a category. Accordingly, the determine one or more categories operation 610 generates a set of multi-dimensional vectors, each multi-dimensional vector corresponding to a statement in the call transcript of the contact.

When the trained call tagging model is a single category model, the model generates a Boolean value that indicate whether or not a statement is in a particular category. Accordingly, the determine one or more categories operation 610 generates an array of Boolean values, each value corresponding to a statement in the call transcript. In other examples, the Boolean value may be replaced with a probability of a statement being in a particular category. The array of Boolean values may be replaced by an array of probabilities.

At determine contact-level categories operation 612, contact-level categories of a contact are determined. In aspects, the contact-level categories are represented by a multi-dimensional vector, each dimension corresponding to a category. Each dimension includes a value that is an average value of the Boolean values (zero or one) of the corresponding categories in the set of multi-dimensional vectors associated with statements. In examples, the value may be an average value of the probabilities of the corresponding categories in the set of multi-dimensional vectors associated with statements. Additionally, or alternatively, the values for the respective dimensions may be a weighted average of the Boolean values among statements. In some aspects, some dimensions (e.g., categories) of the contact-level data may be weighted more than other dimensions.

At determine contextually similar contacts operation 614, one or more contacts that are contextually similar to the selected contact are determined. In examples, contacts that are contextually similar to the select contact indicate a distribution of values associated with contact-level categories. Multi-dimensional contact-level category vectors are substantially similar among contacts that are contextually similar to one another. For example, the determine operation 614 may include comparing similarities of categories of respective contacts (e.g., using cosine similarity) and generates a list of one or more contacts that are contextually similar.

For example, cosine similarity may indicate a degree of similarity between categories of a contact and other contact using multi-dimensional contact-level category vectors or matrices associated with respective contact. The multi-dimensional contact-level category vector describes degrees of relevance of content of a contact to respective context categories. A dimension corresponds to an indication of whether a contact has relevance in a context category.

In aspects, the multi-dimensional contact-level category vectors have common dimensions across contacts in a corpus of contacts. The fixed dimension enables a comparison among vectors by an angular separation. Contacts that are similar to a high degree in context categories indicate contact-level vectors with values that are within a predetermined range in respective dimensions. The angular separation between the contacts may be close to one. Conversely, when two substantially dissimilar calls include distinct likelihood values (i.e., distinct relevance values) for context categories, the angular separation determined using cosine similarity would be large (e.g., the cosine similarity being close to zero). In aspects, the disclosed technology may use a matrix operation for generating angular distances and then sort the generated angular distances to determine the top N nearest neighbors as N contextually similar calls.

At display operation 616, the determined categories of the contact and contextually similar contacts are displayed. In aspects, the method 600 may provide a graphical user interface for interactively select a contact and display one or more categories associated with the contact and a set of contacts that are contextually similar to the selected contact. The method 600 ends with an end operation 618.

As should be appreciated, operations 602-618 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

FIG. 7 illustrates a simplified block diagram of a device with which aspects of the present disclosure may be practiced in accordance with aspects of the present disclosure. The device may be a mobile computing device, for example. One or more of the present embodiments may be implemented in an operating environment 700. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smartphones, network PCs, minicomputers, mainframe computers, distributed computing environments that include any of the above systems or devices, and the like.

In its most basic configuration, the operating environment 700 typically includes at least one processing unit 702 and memory 704. Depending on the exact configuration and type of computing device, memory 704 (e.g., instructions for call tagging as disclosed herein) may be volatile (such as RAM), non-volatile (such as ROM, flash memory, etc.), or some combination of the two. This most basic configuration is illustrated in FIG. 7 by dashed line 706. Further, the operating environment 700 may also include storage devices (removable, 708, and/or non-removable, 710) including, but not limited to, magnetic or optical disks or tape. Similarly, the operating environment 700 may also have input device(s) 714 such as remote controller, keyboard, mouse, pen, voice input, on-board sensors, etc. and/or output device(s) 712 such as a display, speakers, printer, motors, etc. Also included in the environment may be one or more communication connections 716, such as LAN, WAN, a near-field communications network, a cellular broadband network, point to point, etc.

Operating environment 700 typically includes at least some form of computer readable media. Computer readable media can be any available media that can be accessed by the at least one processing unit 702 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media. Computer storage media does not include a carrier wave or other propagated or modulated data signal.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The operating environment 700 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The description and illustration of one or more aspects provided in this application are not intended to limit or restrict the scope of the disclosure as claimed in any way. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The present disclosure relates to systems and methods for call tagging. Any of the one or more above aspects in combination with any other of the one or more aspect. Any of the one or more aspects as described herein.

The invention claimed is:

1. A computer-implemented method, comprising:
retrieving, for training a call tagging model, a set of known phrases associated with a category;
generating a list of phrases for training by expanding the set of known phrases using natural language techniques;
retrieving statement data;
generating a set of training data, wherein the set of training data comprises a first set of statement data with matching known phrases and a second set of statement data without matching known phrases;
training the call tagging model using the set of training data;
fine-tuning the call tagging model using an additional set of training data, wherein the additional set of training data is based on call transcripts associated with contacts in a topic area; and
deploying the call tagging model.

2. The computer-implemented method according to claim 1, wherein the call tagging model comprises a transformer model.

3. The computer-implemented method according to claim 1, further comprising:
masking the set of known phrases in the statement data to create masked statement data; and
updating, the set of training data with the masked statement data.

4. The computer-implemented method according to claim 1, wherein the category represents a contextual category.

5. The computer-implemented method according to claim 1, wherein the category comprises at least one of:
compliance, escalation, billing, or returns.

6. The computer-implemented method according to claim 1, wherein the retrieved statement data comprises one or more sentences, and each of the one or more sentences include one or more words.

7. The computer-implemented method according to claim 1, wherein the call tagging model is a single category model for predicting a single contextual category based on statement data.

8. The computer-implemented method according to claim 1, wherein the call tagging model is a multi-category model for predicting one or more contextual categories based on statement data.

9. A computer-implemented method, comprising:
receiving a selection of a contact;
retrieving a call transcript data associated with the contact;
determining one or more categories associated with one or more statements in the call transcript data using a trained call tagging model, wherein the trained call tagging model generates a set of multi-dimensional statement-level category vectors;
determining a set of contact-level categories associated with the contact based on the set of multi-dimensional statement-level category vectors; and
determining another contact that is contextually similar to the selected contact.

10. The computer-implemented method according to claim 9, wherein determining another contact that is contextually similar further comprises determining contextual similarity based on cosine similarity.

11. The computer-implemented method according to claim 9, wherein the call tagging model comprises a transformer model.

12. The computer-implemented method according to claim 9, wherein a category of the one or more categories represents a contextual category.

13. The computer-implemented method according to claim 9, wherein the one or more categories comprise at least one of:
compliance, escalation, billing, or returns.

14. The computer-implemented method according to claim 9, wherein the call tagging model is a single category model for predicting a single contextual category based on a statement data.

15. A system comprising a processor configured to execute a method comprising:
receiving a selection of a contact;
retrieving a call transcript data associated with the contact;
determining one or more categories associated with one or more statements in the call transcript data using a trained call tagging model, wherein the trained call tagging model generates a set of multi-dimensional statement-level category vectors;
determining a set of contact-level categories associated with the contact based on the set of multi-dimensional statement-level category vectors;
determining a second contact that is contextually similar to the selected contact; and
training, using the determined set of contact-level categories and data associated with the second contact as training data, the trained call tagging model.

16. The system according to claim 15, wherein the call tagging model comprises a transformer model.

17. The system according to claim 15, wherein a category of the one or more categories represents a contextual category.

18. The system according to claim 17, wherein the category of the one or more categories comprises at least one of:
escalation, termination, compliance, customer, complaints, billing, or returns.

19. The system according to claim 15, wherein the call tagging model is a single category model for predicting a single contextual category based on a statement data.

20. The system according to claim 15, wherein the trained call tagging model is a transformer model.

* * * * *